(12) United States Patent
Dubois (10) Patent No.: US 10,444,959 B2
(45) Date of Patent: Oct. 15, 2019

(54) METHOD AND APPARATUS FOR MANAGING MULTIPLE VIEWS FOR GRAPHICS DATA

(71) Applicant: Chuck Dubois, Rochester, NY (US)

(72) Inventor: Chuck Dubois, Rochester, NY (US)

(73) Assignee: FUJIFILM NORTH AMERICA CORPORATION, Valhalla, NY (US)

(*) Notice: Subject to any disclaimer, the term of this patent is extended or adjusted under 35 U.S.C. 154(b) by 359 days.

(21) Appl. No.: 14/728,909

(22) Filed: Jun. 2, 2015

(65) Prior Publication Data

US 2015/0346977 A1 Dec. 3, 2015

Related U.S. Application Data

(60) Provisional application No. 62/006,730, filed on Jun. 2, 2014.

(51) Int. Cl.
| | |
|---|---|
| *G06F 3/0484* | (2013.01) |
| *H04N 1/00* | (2006.01) |
| *G06F 16/54* | (2019.01) |
| *G06T 19/00* | (2011.01) |

(52) U.S. Cl.
CPC ...... *G06F 3/04845* (2013.01); *G06F 3/04842* (2013.01); *G06F 16/54* (2019.01); *G06T 19/00* (2013.01); *H04N 1/0019* (2013.01); *H04N 1/00161* (2013.01); *H04N 1/00188* (2013.01)

(58) Field of Classification Search
CPC ........... G06F 17/30274; G06F 3/04842; G06F 3/04845; G06F 3/017; G06T 19/00; G06T 15/10; G06T 17/00; G06T 19/003; G06T 3/005; H04N 1/00161; H04N 1/00188; H04N 1/0019
See application file for complete search history.

(56) References Cited

U.S. PATENT DOCUMENTS

| | | | | |
|---|---|---|---|---|
| 5,615,318 | A * | 3/1997 | Matsuura ............... | A41H 3/007 345/419 |
| 9,472,161 | B1 * | 10/2016 | Ho .......................... | G09G 5/02 |
| 2001/0009456 | A1 * | 7/2001 | Tanaka .................. | G03B 15/003 355/77 |
| 2001/0026272 | A1 * | 10/2001 | Feld ....................... | A41H 3/007 345/419 |
| 2003/0039926 | A1 * | 2/2003 | Loikkanen ............. | B44C 1/005 430/322 |
| 2003/0071810 | A1 * | 4/2003 | Shoov .................... | G06F 17/50 345/420 |

(Continued)

*Primary Examiner* — Sultana M Zalalee
(74) *Attorney, Agent, or Firm* — Womble Bond Dickinson (US) LLP (57) ABSTRACT

A method and apparatus for managing multiple views of graphics data. In one embodiment, the apparatus comprises a display operable to display a graphical user interface (GUI); multi-view generation logic coupled to the display to select, using the GUI, a plurality of images for a plurality of views that are to appear on a product and to generate a multi-view graphics file containing multiple views; and a graphics rendering module to generate a two-dimensional (2-D) view on the display for use in printing on a 2-D printer and to generate a three-dimensional (3-D) graphical representation of the product on the display, the graphics rendering module being responsive to an input to display different portions of the 3-D graphical representation of the product.

20 Claims, 10 Drawing Sheets

(56) References Cited

U.S. PATENT DOCUMENTS

| | | | |
|---|---|---|---|
| 2004/0066459 A1* | 4/2004 | Fox | H04N 1/32101 348/220.1 |
| 2004/0100652 A1* | 5/2004 | Cooper | G06K 17/00 358/1.15 |
| 2005/0195157 A1* | 9/2005 | Kramer | G06F 3/04845 345/156 |
| 2008/0147219 A1* | 6/2008 | Jones | A43B 1/0054 700/95 |
| 2010/0023878 A1* | 1/2010 | Douris | H04L 12/6418 715/757 |
| 2011/0099463 A1* | 4/2011 | Abagyan | G06T 19/00 715/202 |
| 2011/0099523 A1* | 4/2011 | van Zee | G03D 15/005 715/838 |
| 2011/0157226 A1* | 6/2011 | Ptucha | G06T 11/60 345/638 |
| 2012/0188248 A1* | 7/2012 | Eames | H04N 1/3872 345/428 |
| 2013/0207962 A1* | 8/2013 | Oberdorfer | G06F 3/013 345/419 |
| 2014/0052549 A1* | 2/2014 | Dollens | G06Q 30/0643 705/14.73 |
| 2014/0111678 A1* | 4/2014 | Vikram | H04N 5/23245 348/333.01 |
| 2015/0160822 A1* | 6/2015 | Matsunami | G06F 3/0488 345/173 |

\* cited by examiner

METHOD AND APPARATUS FOR MANAGING MULTIPLE VIEWS FOR GRAPHICS DATA

RELATED APPLICATIONS

The present patent application claims priority to and incorporates by reference the corresponding provisional patent application Ser. No. 63/006,730, titled, Method and Apparatus for Managing Multiple Views for Graphics Data," filed on Jun. 2, 2014.

BACKGROUND

Field of the Invention

Embodiments of the invention relate generally to the field of graphics and image processing. More particularly, embodiments of the invention relate to an apparatus and method for managing multiple views for graphics data.

Description of the Related Art

With the increasing popularity of mobile computing devices, such as smartphones, and their ability to take high resolution digital images, there is a demand for producing print products that incorporate the digital images. Print products can take the form of photographic prints, calendars, photo books, posters, mugs, t-shirts, photo cubes, and the like. Currently there are a few different ways a consumer can order a print product incorporating a digital image.

One way to order a print product is through the use of a kiosk. A kiosk is a self-service computing device that is typically located within a mass retail store, supermarket, drug store, or other convenient location that allows a customer to upload photos and select print products to generate a print order. The selected print products identified in the print order can either be printed by the kiosk itself, or the print order can be fulfilled by a photofinisher that is in communication with the kiosk through a network. The photofinisher may be located in close proximity to the kiosk or at a remote location.

In order to use a kiosk according to the existing methodology to create a print order, the digital images need to be uploaded to the kiosk. In order to do so, customers commonly save the digital images on a portable data storage device, such as a thumb drive or memory card, and connect the portable data storage device to the kiosk.

Another way to order a print product is by using a print product ordering website made available over a wide area network, such as the Internet. In using a print product photo ordering website, a digital image is uploaded to the print product ordering website, the desired print product is selected, and the print order is communicated to the fulfillment center. The ordered print product may then be picked up by the customer at a pick-up location selected by the customer, such as a mass retail store or drug store.

When using a kiosk or a website, the user is typically provided with a graphical user interface through which the user may select photos and products on which those photos are to be printed. For example, the user may select a 3-D item such as a mug or photo cube and then select one or more photos to be printed on the 3-D item.

SUMMARY OF THE INVENTION

A method and apparatus for managing multiple views of graphics data. In one embodiment, the apparatus comprises a display operable to display a graphical user interface (GUI); multi-view generation logic coupled to the display to select, using the GUI, a plurality of images for a plurality of views that are to appear on a product and to generate a multi-view graphics file containing multiple views; and a graphics rendering module to generate a two-dimensional (2-D) view on the display for use in printing on a 2-D printer and to generate a three-dimensional (3-D) graphical representation of the product on the display, the graphics rendering module being responsive to an input to display different portions of the 3-D graphical representation of the product.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As mentioned above, print products offered through kiosks and websites can take the form of photographic prints, calendars, photo books, posters, mugs, t-shirts, photo cubes, and the like. For three-dimensional photo products such as mugs, photo cubes, frames, wraps, etc., two different representations of the print product may be generated: a 2-D view which is used for printing on a 2-D printer and a 3-D view which graphically displays a 3-D image of the product (e.g., so that the user can view what the final product will look like before purchasing). For example, when a user chooses a series of photos to be printed on a photo cube, one embodiment of the invention generates the 3-D view of the final version of the photo cube on the display of the kiosk or the user's computer (e.g., allowing the user to select images and rotate the graphical representation of the cube to view the images on each of the sides of the cube). A 2-D view may also be generated and used for printing a template containing the images selected by the user (e.g., which may subsequently be applied to the surface of a physical photo cube). In one embodiment, as the user is editing either the 3-D view or the 2-D view, one embodiment of the invention automatically reflects the edits in the 2-D view or 3-D view, respectively.

Figure 1:
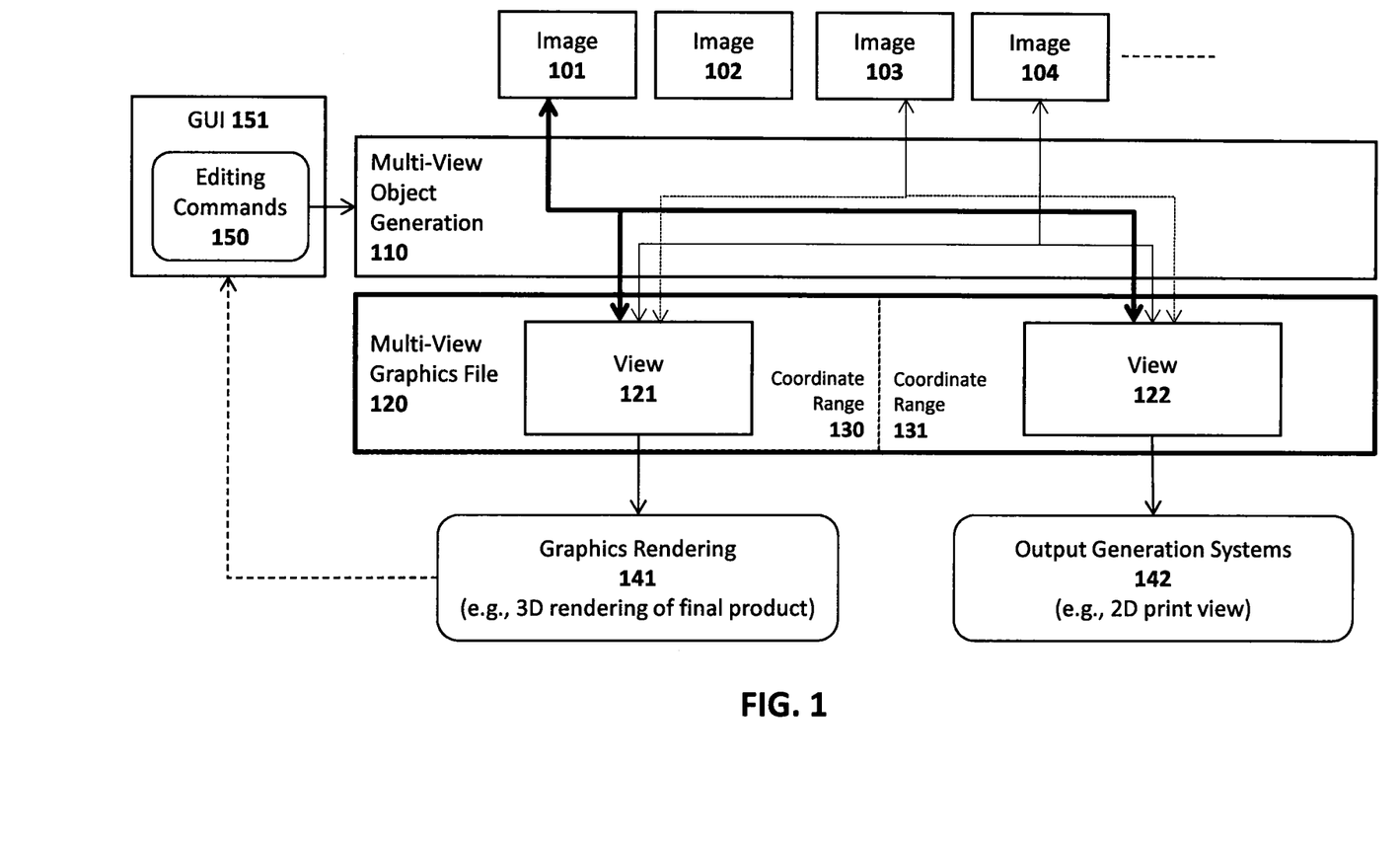
FIG. 1 illustrates one embodiment of an architecture for generating and managing a multi-view graphics file.

FIG. 1 illustrates one embodiment of an apparatus for managing multiple views of a photo- and/or graphics-based product. While these embodiments will be described within the context of 2-D and 3-D views, the underlying principles of the invention are not limited to any particular type of views.

In one embodiment, multi-view object generation logic 110 incorporates one or more of a plurality of images 101-104 into a plurality of views 212-122 of a multi-view graphics file 120. In one embodiment, the multi-view object generation logic 110 comprises a graphics editing application or a module within such an application (e.g., executed on a kiosk or a user's personal computer), allowing the user to select a specific plurality of images 101-104 to be used in the final photo product (e.g., such as the photo cube from the above example). The user may initially select a particular photo/image product from the kiosk or website and, in response, multi-view graphics file 120 containing a particular set of views 121-122 associated with that photo/image product will be selected (see, e.g., FIGS. 2-3 discussed below for a photo cube). The user may then add images and edit either of the views 121-122

In one embodiment, the user selects the images via a graphical user interface 151, thereby generating editing commands 150 which are executed by the multi-view object generation logic 110. For example, the user may graphically click and drag one or more of the images 101-104 to specific regions of a 3-D or 2-D view of the final photo product (e.g., dragging photos to different surfaces of the photo cube, displayed in either a 3-D or a 2-D format). In one embodiment, the commands 150 may instruct the multi-view object generation logic 110 to select specific images 101, 103-104 and generate and/or update the multi-view graphics file 120 containing the multiple views 121-122. In the specific example shown in FIG. 1, images 101, 103, and 104 have been selected by the user (as indicated by the arrows) and incorporated into views 121 and 122.

Although illustrated outside the multi-view graphics file in FIG. 1, in one embodiment, a copy of each image 101, 103-104 is maintained within the multi-view graphics file. In one embodiment, each view 121-122 includes a pointer or other type of data identifying each image 101, 103-104 along with coordinate data specifying the position of the image and additional data defining the layout and/or effects to be applied to the image (e.g., image size, color adjustments, zoom level, text applied over the images, etc). Thus, in this embodiment, only a single copy of each image is shared by multiple views 121-122, thereby preserving storage space and reducing the size of the multi-view graphics file 120.

In one embodiment, the different views 121-122 within the multi-view graphics file 120 are defined based on coordinate ranges 130-131 in which the views are located. In one embodiment, the coordinates for view 122 are limited to a range which is accessible by output generation systems 142 such as 2-D photo applications and printers. For example, in one embodiment, the multi-view graphics file 120 is a Scalable Vector Graphics (SVG) file and the coordinate range 131 set for view 120 is from x=0, y=0 and above—which is the range expected by current output generation systems (e.g., photo printing applications and systems capable of reading SVG files). In contrast, the coordinate range 130 for view 121 may be intentionally set outside of the coordinate range used by the output generation systems. For example, in one embodiment, the range is set to x=−10,000, y=−10,000 and below, which is not typically utilized by such systems (e.g., because it is outside of the printable area). Of course, the specific coordinates set forth above are merely used for illustration purposes. The underlying principles of the techniques detailed herein are not limited to any particular coordinate range for views. A graphics rendering module 141 designed to search for view 121 within coordinate range 130 may then interpret the data in view 121 of the multi-view graphics file 141 to render the 3-D view of the final product to the user (e.g., within the GUI 151 as the user is editing the photo product). Thus, a single file may be used to support both the 3-D rendering 141 and the output generation 142 (e.g., printing).

Figure 2:
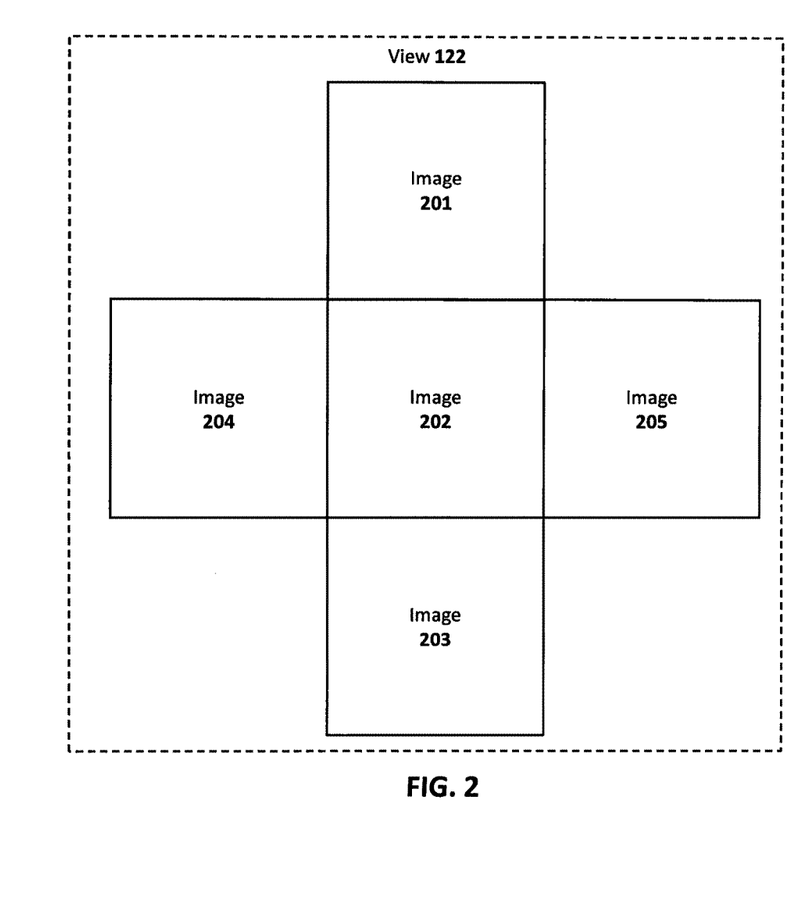
FIG. 2 illustrates an exemplary two-dimensional (2-D) view such as may be used for 2-D printing.
Figure 3:
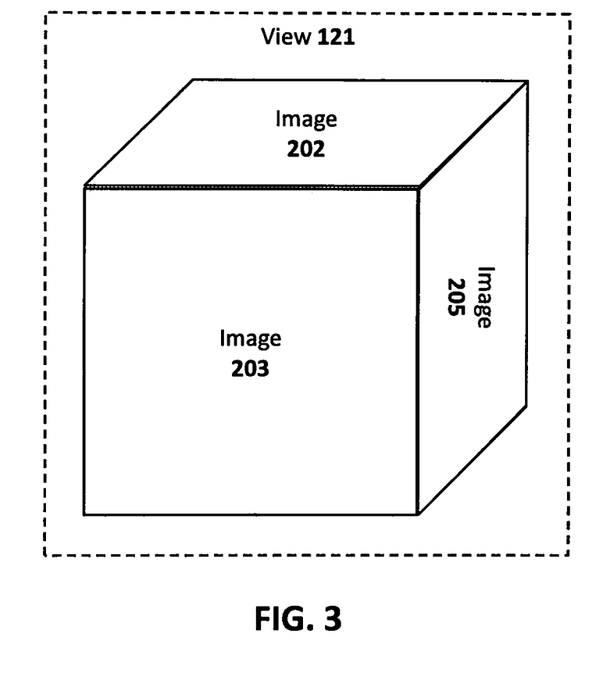
FIG. 3 illustrates an exemplary three-dimensional (3-D) view of a final product ordered by a user.

Returning to the photo cube example, FIG. 2 illustrates an exemplary 2-D view 122 of the photo cube (e.g., a view which may be used by an output generation system to print the images for the photo cube) including a set of 5 images 201-205 selected by the user. FIG. 3 illustrates an exemplary 3-D view 121 of the photo cube including the images 202-203, 205 selected by the user. As mentioned, the user may be provided with the ability to manipulate the 3-D image via the GUI 151 to view the images on every side of the photo cube.

In one embodiment, when the end user arranges and edits the images 101-104 in one view, the changes are automatically implemented in the other view(s). For example, if the user places image 101 in a particular location in a first view 121 in the photo product (e.g., mug, photo cube, etc), then the image will be placed in a corresponding location in the second view 122 (and vice versa). In one embodiment, this is accomplished by setting the coordinates for each view 121-122 within each of the respective coordinate ranges 130-131. In addition, if the user edits an image in one view (e.g., zooms in/out, scales, recolors, etc), the edits will be reflected in the second view. For example, in one embodiment, edits made in the 2-D view or 3-D view are automatically made in the other view. In one embodiment, the changes are automatically reflected in all views because only one copy of the image is used within the multi-view graphics file 120. The views of this embodiment may simply include references to the underlying edited image data (e.g., implemented via "use" statements if the multi-view graphics file 120 is in an SVG format).

Having described the system and method of the present invention and an embodiment thereof, an exemplary computer environment for implementing the described design and execution is presented next.

Figure 4:
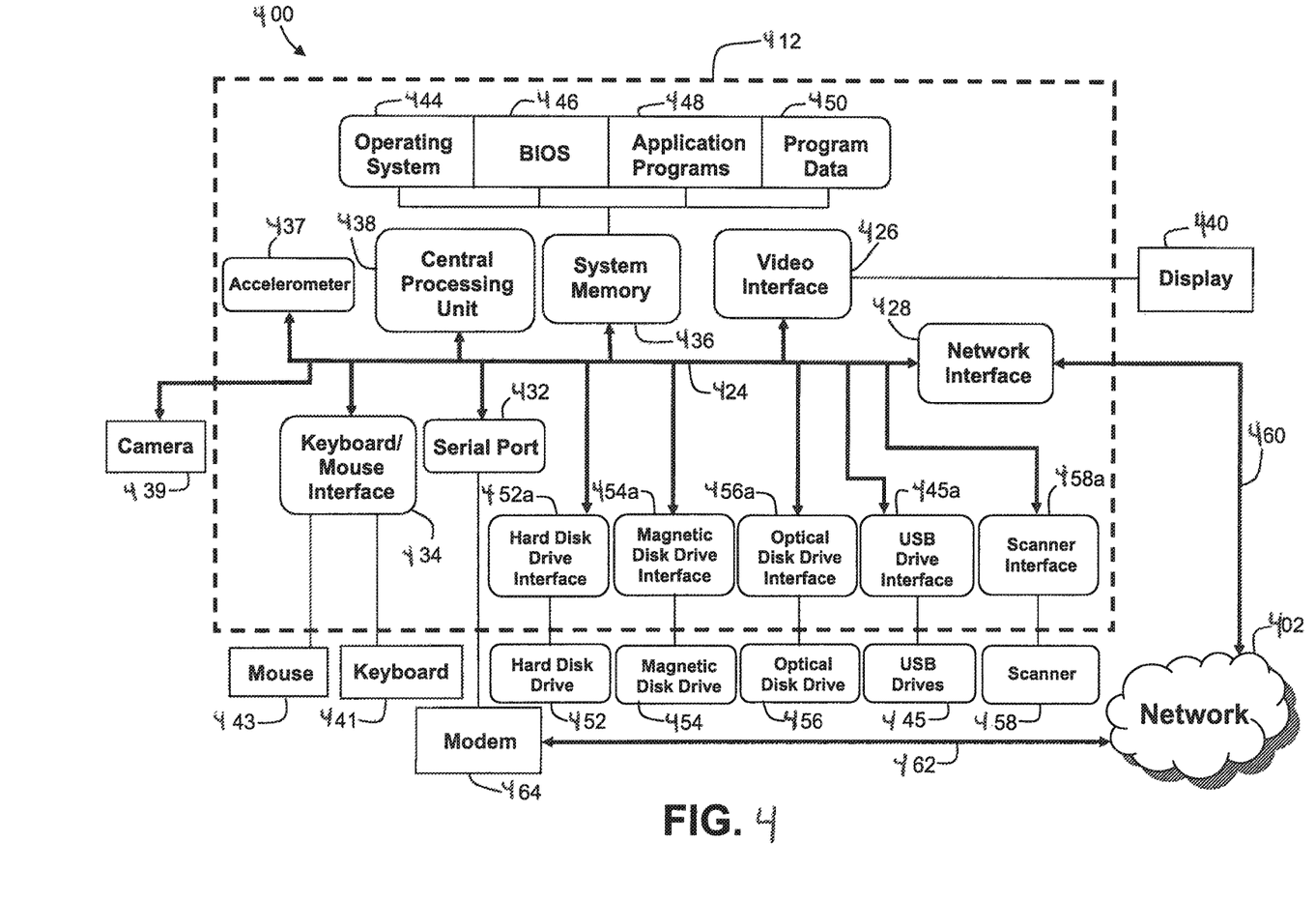
FIG. 4 is a block diagram generally illustrating a computing environment in which embodiments of the invention may be implemented.

FIG. 4 illustrates an exemplary computing environment 400 that can be used to implement any of the processing thus far described. Computing environment 400 may include one or more computers 412 (such as photofinishers, a photo lab system, a mobile computing device, or a digital image data storage server) comprising a system bus 424 that couples a video interface 426, network interface 428, a keyboard/mouse interface 434, a printer interface 422, and a system memory 436 to a Central Processing Unit (CPU) 438. A monitor or display 440 is connected to bus 424 by video interface 426 and provides the user with a graphical user interface to view the stored digital images, available print products, print orders, etc. The printer interface 422, for example, allows for a printer 424 associated with a photofinisher to be used to produce the print products specified in the print orders. The graphical user interface allows the user to enter commands and information into computer 412 using a keyboard 441 and a user interface selection device 443, such as a mouse or other pointing device, or using a touch screen system. Keyboard 441 and user interface selection device are connected to bus 424 through keyboard/mouse interface 434. The display 440 and user interface selection device 443 are used in combination to form the graphical user interface which allows the user to implement at least a portion of the present invention. Other peripheral devices may be connected to the computer through universal serial bus (USB) drives 445 to transfer information to and from computer 412. For example, cameras and camcorders may be connected to computer 412 through serial port 432 or USB drives 445 so that data representative of a digital image, or other digital content may be downloaded to system memory 436 or another memory storage device associated with computer 412 such that the images may be subsequently printed by one or more of photofinishers. It should be understood that the computing devices described herein, such as a mobile computing device, may not necessarily include all of the features described herein with respect to computer 412. For example, a mobile computing device may not necessarily include printer 424.

The system memory 436 is also connected to bus 424 and may include read only memory (ROM), random access memory (RAM), an operating system 444, a basic input/output system (BIOS) 446, application programs 448 and program data 450. The computer 412 may further include a hard disk drive 452 for reading from and writing to a hard disk, a magnetic disk drive 454 for reading from and writing to a removable magnetic disk (e.g., floppy disk), and an optical disk drive 456 for reading from and writing to a removable optical disk (e.g., CD ROM or other optical media). The computer 412 may also include USB drives 445 and other types of drives for reading from and writing to flash memory devices (e.g., compact flash, memory stick/PRO and DUO, SD card, multimedia card, smart media xD card), and a scanner 458 for scanning items such as still image photographs to be downloaded to computer 412. A hard disk drive interface 452a, magnetic disk drive interface 454a, an optical drive interface 456a, a USB drive interface 445a, and a scanner interface 458a operate to connect bus 424 to hard disk drive 452, magnetic disk drive 454, optical disk drive 456, USB drive 445 and scanner 458, respectively. Each of these drive components and their associated computer-readable media may provide computer 412 with non-volatile storage of computer-readable instruction, program modules, data structures, application programs, an operating system, and other data for computer 412. In addition, it will be understood that computer 412 may also utilize other types of computer-readable media in addition to those types set forth herein, such as digital video disks, random access memory, read only memory, other types of flash memory cards, magnetic cassettes, and the like.

Computer 412 may operate in a networked environment using logical connections with system 100. Network interface 428 provides a communication path 460 between bus 424 and network 402, which allows, for example, a print order to be communicated from a mobile computing device through network 402 to a photo lab system or a photofinisher. Other types of information, such as, data associated with a digital image, may also be communicated from bus 424 through a communication path 462 to network 402 using serial port 432 and a modem 464, for instance when stored digital image data is retrieved from a digital image storage server to a mobile computing device 412. It will be appreciated that the network connections shown herein are merely exemplary, and it is within the scope of the present invention to use other types of network connections between computer 412 and photofinishers including both wired and wireless connections.

In one embodiment, an upsell screen is displayed on display 440 showing the 3-D representation on another product (e.g., a mug) that can be ordered by the user. Using the user interface, the user is able to click on the screen to go to an editor that enables the user to make edits to the 2-D representation associated with the 3-D representation.

Figure 5:
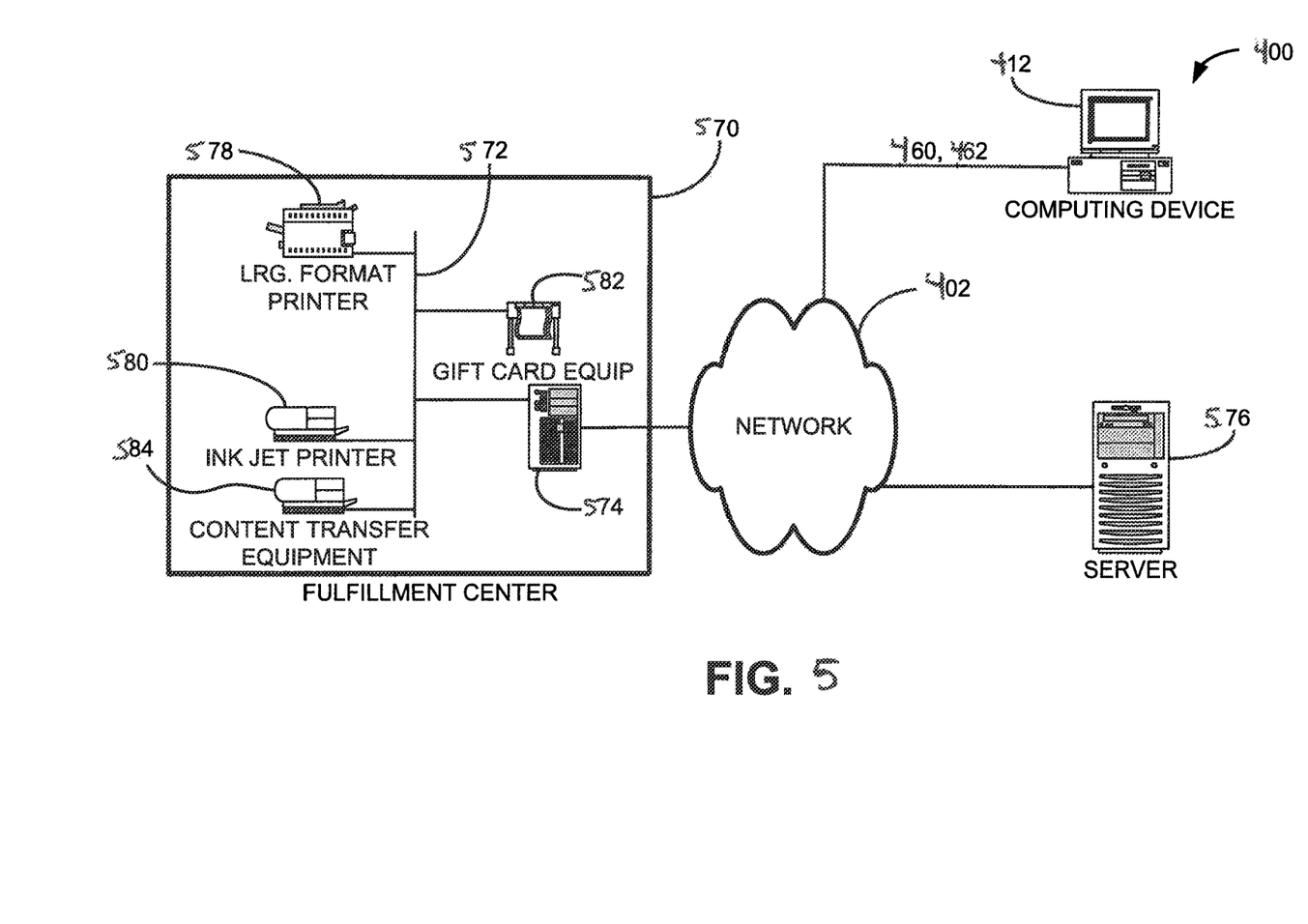
FIG. 5 is a schematic diagram showing a computing device connected to a network environment including a fulfillment center.

As best seen in FIGS. 4 and 5, computer 412 may operate in a networked environment using logical connections with a fulfillment center 470. Network interface 428 provides a communication path 460 between bus 424 and network 402, which allows, for example, an order from a customer to be communicated through network 402 to fulfillment center 470 for a product selection, or to obtain access to base digital images (or image effects) that are used in the 2-D and 3-D views. Obtaining the base digital images or image effects, for example, may also be communicated from bus 424 through a communication path 462 to network 402 using serial port 432 and a modem 464. Using a modem connection between the computer 412 and a fulfillment center 470 is commonly used in conjunction with a wide area network (WAN). It will be appreciated that the network connections shown herein are merely exemplary, and it is within the scope of the present invention to use other types of network connections between remote computer 412 and fulfillment center 470 including both wired and wireless connections.

As best seen in FIG. 5, fulfillment center 570 may also be remotely located and connected to network 402. The fulfillment center 570 may have its own local area network 572 and a local server 516 for storing base digital images and image effects, in addition to other devices for fulfilling customer print orders. The server 574 may provide local services in addition to providing communication and data exchange with a network server 576. Fulfillment center 570 may include a large photo format printer 578, ink jet printers 580, gift card equipment 582, content transfer equipment 584 or other devices for transferring or incorporating digital images onto a variety of mediums by, for example, printing, etching, embroidering, and embroidering.

Network server 576 may also be connected to network 402 to provide any one or more of a variety of functions including serving as a web server, data store, and application server and/or provide other services that will provide computing device 412 and/or fulfillment center 570 with access to base digital images or image effects, or provide a storage location for base digital images or image effects for future use.

After the base digital image and image effect is obtained, the method further includes the optional step of editing the image effect and/or the base digital image. The editing can be accomplished using a digital image editing application program located on a computing device 412, or by accessing through the network 402 a digital image editing application program hosted by fulfillment center 570 or by network server 576. Editing can take the form of cropping, resizing, reorienting, or changing one or more characteristics of the image itself, such as, for example, the contrast, hue, brightness, or the like.

The techniques described herein include associating the image effect with the base digital image. Associating the image effect with the base digital image can take the form of overlaying the image effect and the base digital image. For example, the image effect could be positioned on top of the base digital image. It should be understood that the imaging effect could be edited prior to the next steps of simulating the print product to change the orientation, size, color, or other attribute of the components relative to the base digital image to customize the look and feel of the print product.

Figure 6:
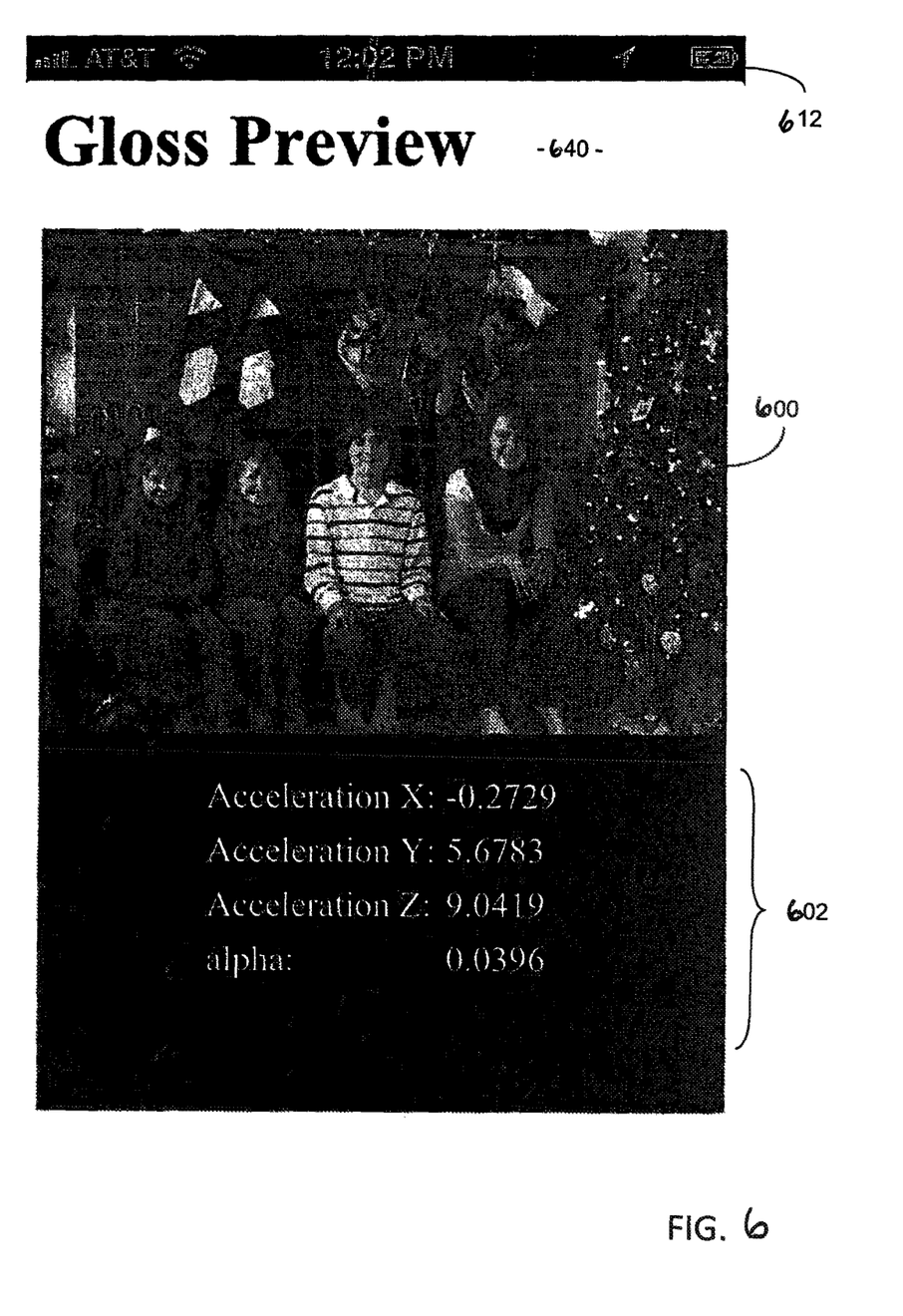
FIG. 6 is a base digital image that may be used in accordance with the present invention and representative accelerometer data.

The techniques described herein further include displaying one of images (600 of FIG. 6) when display 440 of computing device 412 is positioned in a first orientation, or normalized position. Computing device 412 may include accelerometer 437 that measures the force of acceleration of the computing device 412, which in turn allows for the angle or relative position of the computing device 412, and thus display 440, to be determined relative to a normalized position. An exemplary set of accelerometer data 602 is shown in FIG. 6. When the alpha number is equal to zero, display 440 is being held in a normalized position and the image effect will not be visible on display 440, and only the base digital image 600 will be viewed on display 440. It should be understood that data 602 is not typically displayed on display 440, but has been shown for purposes of explaining the present invention.

Figure 7:
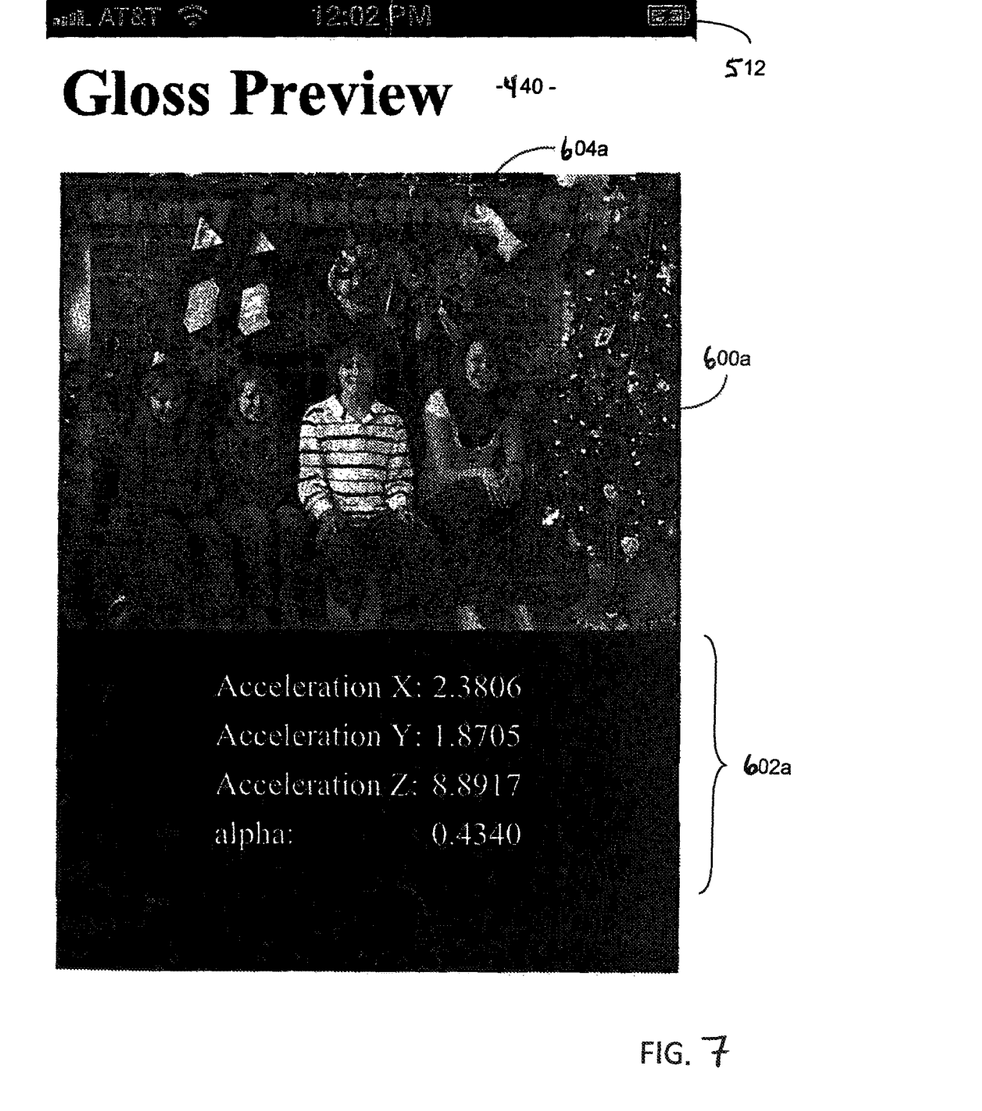
FIG. 7 is an illustration similar to FIG. 6 showing a variation in the accelerometer data and an image effect overlaid on the base digital image.
Figure 8:
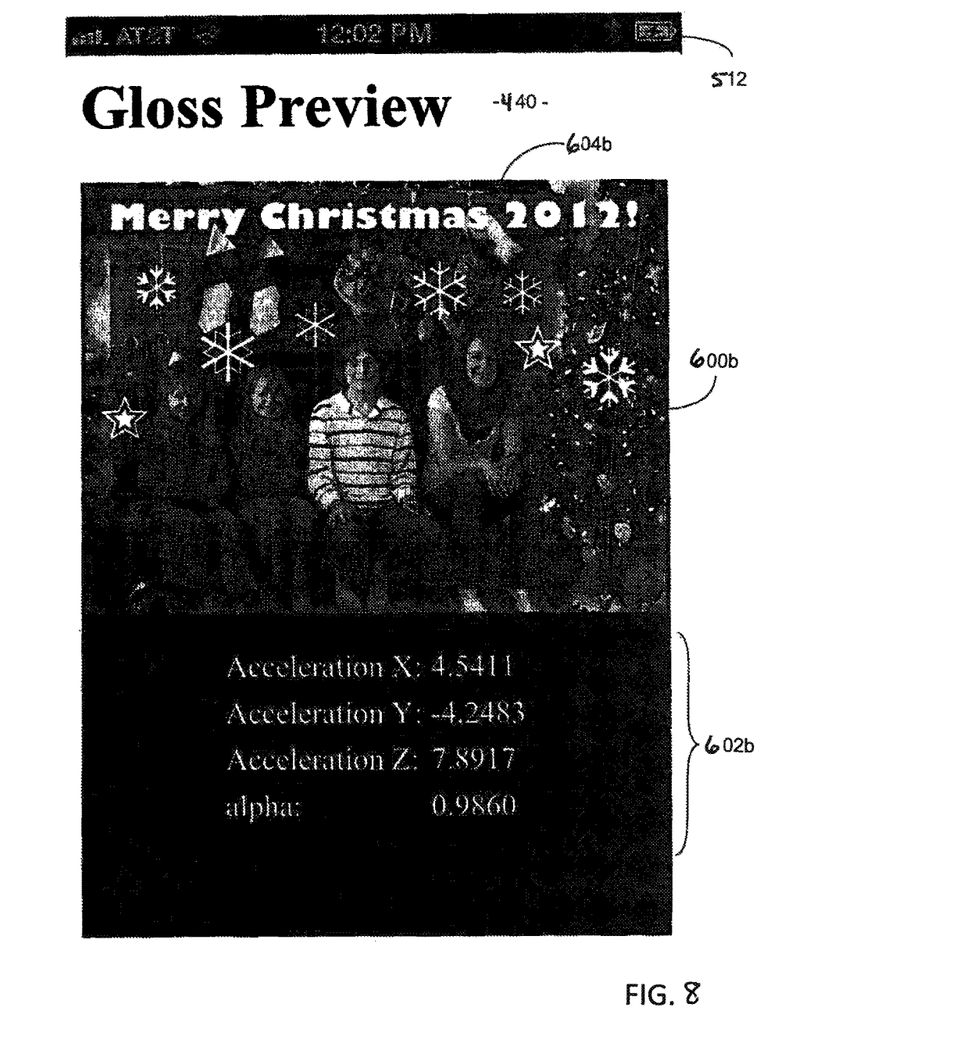
FIG. 8 is an illustration similar to FIG. 7 showing a further variation in the accelerometer data, wherein the image effect is shown in a contrast that is darker than shown in FIG. 7.

As best seen in the sequence of FIGS. 7 and 8, an imaging effect may take the form of a second digital image 604*a*, 604*b* that may be overlaid or superimposed on base digital image 600 in a varying degree of contrast depending on the orientation of display 440 relative to the normalized position shown in FIG. 4. As computing device 412 is moved from the normalized position, the accelerometer senses its movement, the alpha number increases, and the contrast of the image effect 604*a*, 604*b* increases. In other words, the image effect 604*a*, 604*b* gets darker. As best seen in FIG. 7, the alpha number is equal to 0.4340 and second digital image 604*a* is starting to become visible on display 440. Further, as best seen in FIG. 8, computing device 412 has been moved even further from the position shown in FIG. 7, the alpha number has increased to 0.9860, and the contrast of image effect 604*b* has increased further. As can be seen by the sequence of FIGS. 6-8, the movement of computing device 412, and thus display 440, from the normalized position results in image effect 604*a*, 604*b* being superimposed on top of base digital image 600. Further, it is noted that base digital image 600 may be fully displayed even though the contrast of image effect 604 is changing as the position of the display 440 changes.

In one embodiment, a camera may be used to detect the relative position of an object, such as a light source or user of the computing device, and simulate the image effect on the base digital image based on movement of object or to move an image being displayed (e.g., a 3-D representation) based on movement of the object. It should be understood that many of the functions and operations set forth with respect to the first aspect of the present invention also apply to this aspect of the present invention, and need not be repeated. However, the camera used in one embodiment is configured to operate in conjunction with object or facial recognition software stored either locally or remotely that is capable of recognizing or establishing a "normalized" position of an object, such as the head of a user of the computing device, and determine the magnitude in which the object has moved from the normalized position.

Figure 9A:
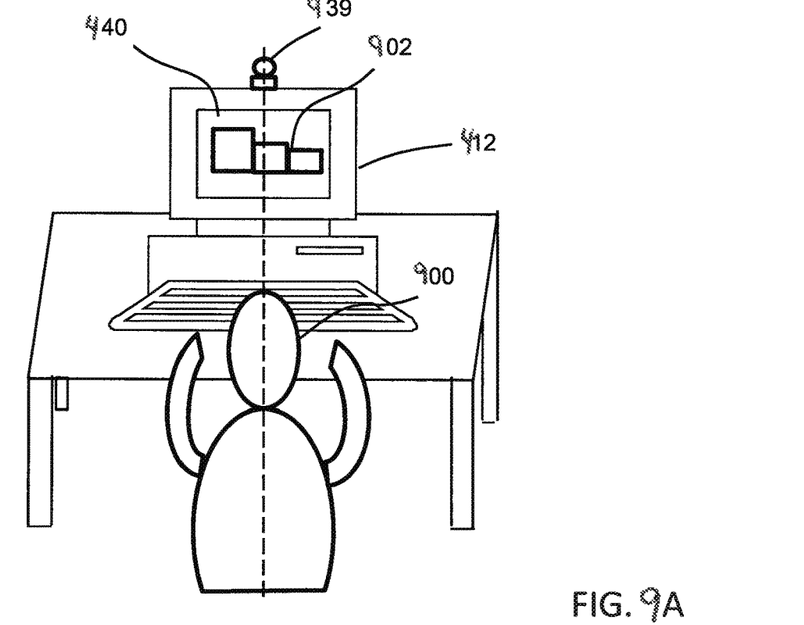
FIG. 9A is a diagram showing a second aspect of the present invention with an object in the normalized position and displaying the base digital image.

As best seen in FIG. 9A, when an object 900 is viewing display 440 of computing device 412 in a normalized position (e.g., a first viewing angle), an image effect would not be displayed on base digital image 902. As a camera 439 on computing device 412 determines that the object 900 has changed position from the normalized position to a second position, as best seen in FIG. 9B, then the contrast of image effect 904 will increase as the object moves further from the normalized position to a second viewing angle 906.

In a further aspect of the present invention that relates to the use of the camera to determine the position of an object relative to a normalized position for purposes of changing the view of a representation (e.g., 2-D, 3-D, etc.). As object 900 moves, the view of an image being displayed is moved. For example, as a user moves, a 3-D representation (e.g., photo cube) may be rotated.

Figure 9B:
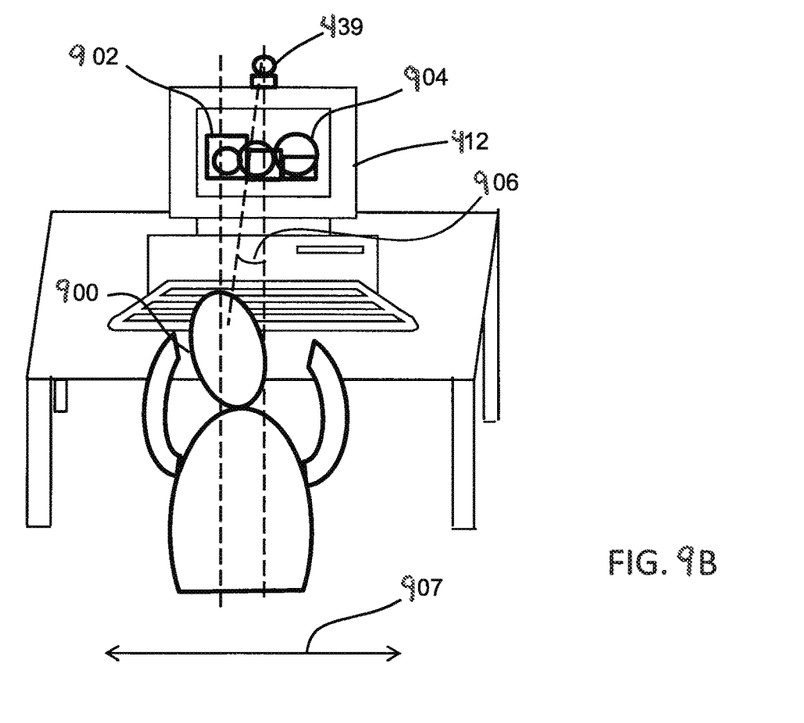
FIG. 9B is a diagram similar to FIG. 9B showing the object in a second position.
Figure 10A:
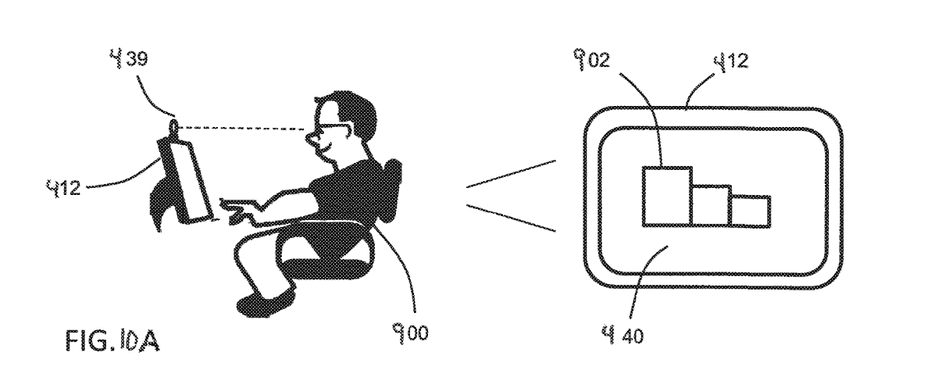
FIG. 10A is a diagram showing another aspect of the present invention showing an object in a normalized position and showing the base digital image.
Figure 10B:
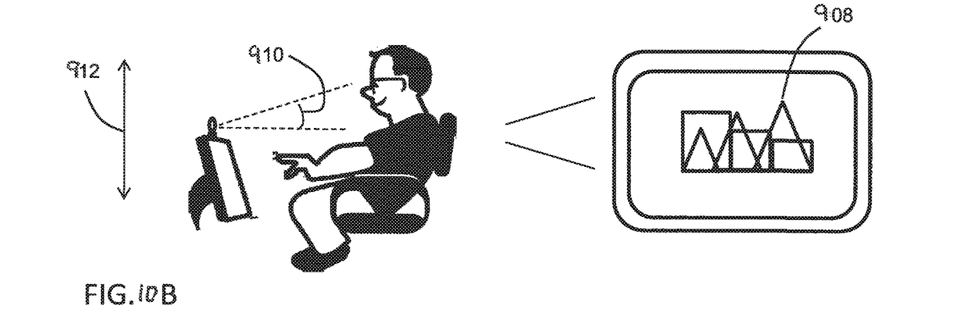
FIG. 10B is a diagram similar to FIG. 7A showing an object in a second position and showing a first image effect overlaid on the base digital image.
Figure 10C:
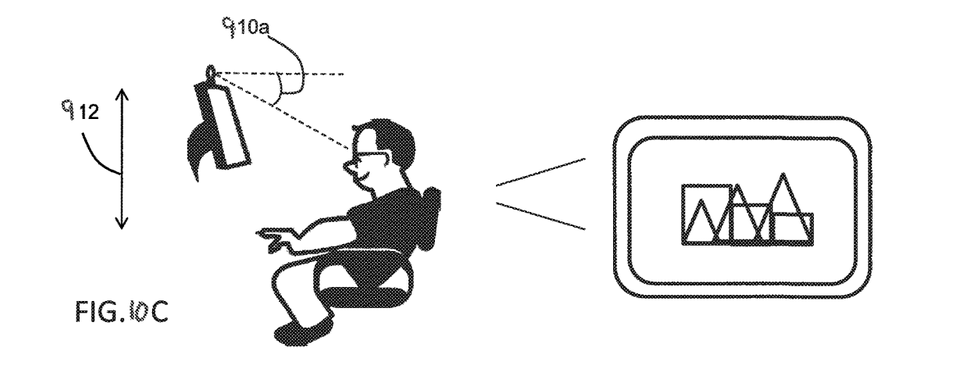
FIG. 10C is a diagram similar to FIG. 7A showing the object in a third position and showing a second image effect overlaid on the base digital image.

Also, as indicated above with respect to FIGS. 9A and 9B, the contrast of image effect 904 increases as viewing angle 906 of object 900 increases in a side-to-side direction 907. In addition, the present invention also includes providing a second image effect 908 that is overlaid on top of base digital image 902, which increases in contrast when camera 439 determines that object 900 has moved in a vertical direction 912, or a direction other than direction 907, to establish a viewing angle 910, 910*a* that varies from a normalized position. In other words, the contrast of second image effect 908 will increase or otherwise change as viewing angle 910, 910*a* increases.

In yet another aspect of the present invention, the contrast of image effect may change based on a user interacting with the computing device 412, such as by finger swiping the display 440, or using the keyboard 441 or mouse 443 to move the viewing angle of the base digital image. This method may be implemented without having to rely on an accelerometer or a camera that senses the movement of the users viewing angle of the display.

The method of the present invention provides a method of simulating imaging effects on a base digital image without the need to print or produce an actual physical product having such a feature. It should also be understood that the aspects of the present invention may also be implemented in digitally displaying lenticular prints. In addition, it should also be understood that any of the above-referenced method can be stored on a non-transitory computer-readable medium and implemented using computer-executable instructions.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirements.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims.

I claim:

1. An apparatus comprising:
    a display operable to display a graphical user interface (GUI);
    a processor coupled to a memory programmed with executable instructions that, when executed, implement:
        multi-view generation logic coupled to the display configured to:
            select, using the GUI, a three-dimensional (3-D) photo product, the 3-D photo product comprising a 3-D object upon which a plurality of two-dimensional (2-D) images selected by a user will be applied;
            select, using the GUI, the plurality of 2-D images, and selecting a view in a plurality of views of the 3-D photo product where each selected 2-D image in the plurality of 2-D images is to be located on the 3-D photo product, each 2-D image corresponding to a view in a plurality of views that are to appear on the 3-D photo product and to generate a multi-view graphics file containing multiple views of the 3D photo product, wherein a single copy of each of the plurality of 2-D images is stored in the multi-view graphics file, and each image is stored with layout and/or effects to be applied to the image;
        a graphics rendering module configured to:
            generate a two-dimensional (2-D) view on the display of the 3D photo product showing two or more of the plurality of 2-D images as the two or more 2-D images will appear on the 3-D photo product and for use in printing on a 2-D printer, and
            generate a 3-D graphical representation of the 3-D photo product on the display showing two or more of the plurality of 2-D images on the 3-D graphical representation of the 3-D photo product,
            the graphics rendering module being responsive to an input to display different orientations of the 3-D graphical representation of the 3-D photo product, wherein the 2-D view and 3-D graphical representations are each generated from the multi-view graphics file containing the single copy of each of the plurality of 2-D images and stored layout and/or effects to be applied to the image; and
        printing logic operable to generate a print job that causes a 2-D printer to print a 2-D product that is used to create the 3-D photo product displayed in the 3-D graphical representation.

2. The apparatus defined in claim 1 wherein the graphics rendering module searches a plurality of views in the multi-view graphics file containing the plurality of images to interpret the data in the plurality of views in order to render the 3-D graphical representation, and wherein the multi-view graphics file comprises a scalable vector graphics file.

3. The apparatus defined in claim 1 wherein the multi-view generation logic selects one or more of the plurality of images based on user input.

4. The apparatus defined in claim 1 wherein each view includes information identifying an image and coordinate data specifying a position of the image.

5. The apparatus defined in claim 3 wherein each view further includes data defining one or more of a layout or effects applied to the image, wherein effects include or more of a textual overlay or a graphical image overlay applied to the image.

6. The apparatus defined in claim 1 wherein the input comprises a camera input indicating that an object has moved to a different position.

7. The apparatus defined in claim 6 wherein the graphics rendering module displaying the different position of the 3-D graphical representation of the 3-D photo product by causing the 3-D graphical representation of the product to appear to have been rotated on the display, in response to the camera input.

8. The apparatus defined in claim 7 wherein responsive to user edits made via the GUI on an image in a first view, the multi-view generation logic is operative to cause the user edits to be made to the image in a second view different than the first view.

9. The apparatus of claim 1, wherein the apparatus comprises the 2-D printer.

10. The apparatus of claim 1, wherein:
in response to multi-view generation logic receiving a selection of a 2-D image and a selection of which of the plurality of views to place the 2-D image that are to appear on the 3-D photo product, the graphics rendering module updates the 2-D view on the display for use in printing on a 2-D printer, and updates the 3-D graphical representation of the 3-D photo product on the display to show the selected 2-D image in the selected view of the plurality of views.

11. The apparatus of claim 1, wherein the 3-D object excludes clothing.

12. The apparatus of claim 1, wherein the 3-D photo product comprises one of a frame or a cube.

13. The apparatus of claim 1, there apparatus further comprising an accelerometer, wherein the accelerometer senses movement of the apparatus and changes a contrast value of an image in response to the movement, wherein the image is one of the selected 2-D images or an image to be overlaid on one of the selected 2-D images.

14. A method comprising:
displaying a graphical user interface (GUI);
selecting, using the GUI, a three-dimensional (3-D) photo product, the 3-D photo product comprising a 3-D object upon which a plurality of two-dimensional (2-D) images selected by a user will be applied;
selecting, using the GUI, the plurality of 2-D images, and select a view in a plurality of views of the 3-D photo product where each selected 2-D image in the plurality of 2-D images is to be located on the 3-D photo product, each image corresponding to a view in a plurality of views that are to appear on the 3-D photo product, wherein a single copy of each of the plurality of 2-D images is stored in the multi-view graphics file, and each image is stored with layout information and/or effects to be applied to the image;
generating a multi-view graphics file containing multiple views having the plurality of images; and
generating a 2-D view on the display of the plurality of the 3D photo product showing two or more of the plurality of 2-D images as the 2-D images will appear on the 3-D photo product, and the 2-D view for use in printing on a 2-D printer;
generating a 3-D graphical representation of the 3-D photo product on the display showing two or more of the plurality of 2-D images on the 3-D graphical representation of the 3-D photo product;
displaying, responsive to an input, different orientations of the 3-D graphical representation of the 3-D photo product, wherein the 2-D view and 3-D graphical representations are each generated from the multi-view graphics file containing the single copy of each of the plurality of 2-D images and stored layout information and/or effects to be applied to the image; and
generating a print job that causes a 2-D print device to print a 2-D product that is used to create the 3-D photo product displayed in the 3-D graphical representation.

15. The method defined in claim 14 further comprising searching a plurality of views in the multi-view graphics file containing the plurality of images to interpret the data in the plurality of views in order to render the 3-D graphical representation, and wherein the multi-view graphics file comprises a scalable vector graphics file.

16. The method defined in claim 14 wherein each view includes information identifying an image and coordinate data specifying a position of the image.

17. The method defined in claim 16 wherein each view further includes data defining one or more of a layout or effects applied to the image, wherein effects include a textual overlay or a graphical image overlay applied to the image.

18. The method defined in claim 14 wherein the input comprises a camera input indicating that an object has moved to a different position.

19. The method defined in claim 18 wherein displaying the different position of the 3-D graphical representation of the 3-D photo product comprises causing the 3-D graphical representation of the product to appear to have been rotated on the display, in response to the camera input.

20. The method defined in claim 19 wherein responsive to user edits made via the GUI on an image in a first view, editing the image in a second view different than the first view using the user edits.

* * * * *